United States Patent [19]

Hirano et al.

[11] Patent Number: 5,831,687
[45] Date of Patent: Nov. 3, 1998

[54] COLOR VIDEO SIGNAL PROCESSING METHOD AND APPARATUS FOR CONVERTING DIGITAL COLOR DIFFERENCE COMPONENT SIGNALS INTO DIGITAL RGB COMPONENT SIGNALS BY A DIGITAL CONVERSION

[75] Inventors: Yasutoshi Hirano, Ikeda; Takashi Michiyoshi, Toyonaka, both of Japan

[73] Assignee: Ricoh Company, Ltd., Tokyo, Japan

[21] Appl. No.: 701,596

[22] Filed: Aug. 22, 1996

[30] Foreign Application Priority Data

Sep. 5, 1995 [JP] Japan ................................. 7-227893

[51] Int. Cl.$^6$ ................................. H04N 9/64; H04N 9/67
[52] U.S. Cl. ......................... 348/659; 348/660; 348/708; 345/154
[58] Field of Search .................................... 348/649, 651, 348/639, 708, 646, 453, 448, 659, 660; 345/154, 150; H04N 9/64, 9/66, 9/67, 7/01; G09G 5/04

[56] References Cited

U.S. PATENT DOCUMENTS 4,725,894  2/1988  Sasaki et al. .
5,006,927  4/1991  Creed et al. .
5,703,993  12/1997  Kendo et al. .

*Primary Examiner*—Andrew I. Faile
*Assistant Examiner*—Quenedy Pierre-Louis
*Attorney, Agent, or Firm*—Cooper & Dunham

[57] ABSTRACT

In a color video signal processing method, color difference component signals are converted into RGB component signals by a digital to digital conversion so as to reduce a size of a processing unit used for the conversion. An analog composite signal is converted into analog color difference component signals. The analog color difference component signals are then converted into digital color difference component signals. The digital color difference component signals are converted into digital RGB component signals by a digital to digital conversion based on an approximation method. Finally, the digital RGB component signals are converted into analog RGB component signals. The digital-to-digital conversion may be performed in accordance with equations in which each factor is a fractional number having a denominator of a power of 2.

20 Claims, 4 Drawing Sheets

FIG. 3

| | 0 | 1 | 2 | 3 | 4 | 5 |
|---|---|---|---|---|---|---|
| | 0 | 0 | BY[0] | BY[1] | BY[2] | BY[3] |
| | 0 | BY[0] | BY[1] | BY[2] | BY[3] | BY[3] ← SIGN DIGIT EXTENSION |

+

| BY[0] | S0 | S1 | S2 | S3 | S4 |
|---|---|---|---|---|---|

COLOR VIDEO SIGNAL PROCESSING METHOD AND APPARATUS FOR CONVERTING DIGITAL COLOR DIFFERENCE COMPONENT SIGNALS INTO DIGITAL RGB COMPONENT SIGNALS BY A DIGITAL CONVERSION

BACKGROUND OF THE INVENTION

1. Field of the Invention

The present invention generally relates to a color video signal processing method and apparatus and, more particularly, to a color video signal processing method and apparatus for processing color difference component signals to obtain RGB component signals by a digital processing technique.

2. Description of the Related Art

Generally, a color video signal for a CRT display used in a TV set or a computer comprises an analog composite signal. The analog composite signal is converted into analog RGB signals by a video signal processing apparatus before being supplied to the CRT display.

In a conventional method, the analog composite signal is converted into analog RGB component signals by the following processes.

1) The analog composite signal is converted into analog color difference component signals $Y_A$, $(R-Y)_A$ and $(B-Y)_A$. The analog color difference component signal $Y_A$ corresponds to a luminance signal. The analog color difference component signal $(R-Y)_A$ corresponds to a component obtained by subtracting the luminance signal from a red signal. The analog color difference component signal $(B-Y)_A$ corresponds to a component obtained by subtracting the luminance signal from a blue signal.

2) The color difference component signals $Y_A$, $(R-Y)_A$ and $(B-Y)_A$ are then converted into analog RGB component signals $R_A$, $G_A$ and $B_A$ by an analog processing technique.

3) The analog RGB component signals $R_A$, $G_A$ and $B_A$ are converted into digital RGB component signals $R_D$, $G_D$ and $B_D$ by a digital encoding process (analog to digital conversion process).

4) The digital RGB component signals $R_D$, $G_D$ and $B_D$ are processed for changing, for example, a color of the image to be displayed on the CRT, if necessary.

5) The digitally processed digital RGB component signals $R_D$, $G_D$ and $B_D$ are converted into analog RGB component signals by an analog-to-digital conversion process, and are supplied to the CRT display.

In the above-mentioned process, the conversion of the analog color difference component signals $Y_A$, $(R-Y)_A$ and $(B-Y)_A$ into the analog RGB component signals $R_A$, $G_A$ and $B_A$ is performed based on the following equations. The conversion is performed by an analog to analog process.

$$Y_A = 0.3R_A + 0.59G_A + 0.11B_A \quad (1)$$

$$(R-Y)_A = -0.59G_A + 0.7R_A - 0.11B_A \quad (2)$$

$$(B-Y)_A = -0.59G_A - 0.3R_A + 0.89B_A \quad (3)$$

By solving the above-maintained equations with respect to the analog RGB component signals $R_A$, $G_A$ and $B_A$ the following equations are obtained.

$$R_A = Y_A + (R-Y)_A \quad (4)$$

$$G_A = Y_A - (0.3/0.59) \times (R-Y)_A - (0.11/0.59) \times (B-Y)_A \quad (5)$$

$$B_A = Y_A + (B-Y)_A \quad (6)$$

Apparent from the above equations, the conversion of the color difference component signals into the RGB component signals are performed based on equations including factors comprising a decimal particularly in the equation (5). Thus, in the conventional method, the conversion is performed in the analog signal state.

Each of the above-mentioned processes are performed by a processing unit comprising an LSI chip. In order to reduce a size of each processing unit or incorporate the processing units into a single LSI chip, a size of each processing unit must be as small as possible. However the analog processing unit used for performing the above-mentioned process (2) inevitably has to be large due to the analog processing. Thus, the size of the processing unit used for the process (2) is a bottle-neck for reducing the size of the color video signal processing apparatus.

SUMMARY OF THE PRESENT INVENTION

It is a general object of the present invention to provide an improved and useful color video signal processing method and apparatus in which the above-mentioned problems are eliminated.

A more specific object of the present invention is to provide a color video signal processing method and apparatus in which the color difference component signals are converted into the RGB component signals by a digital-to-digital conversion so as to reduce a size of the processing unit used for the conversion.

In order to achieve the above-mentioned objects, there is provided according to one aspect of the present invention a color video signal processing method for converting an analog composite signal into analog RGB component signals, comprising the steps of:

converting the analog composite signal into analog color difference component signals;

converting the analog color difference component signals into digital color difference component signals;

converting the digital color difference component signals into digital RGB component signals by a digital to digital conversion based on an approximation method; and converting the digital RGB component signals into the analog RGB component signals.

According to the above-mentioned invention, the digital color difference component signals are converted into the digital RGB component signals by a simple operation based on a digital signal process by using approximated equations. Thus, a circuit performing the digital-to-digital conversion can be constructed by a simple digital process circuit. This permits the color video signal processing apparatus using the method of the present invention to be formed in a single LSI chip.

In the color video signal processing method, the digital-to-digital conversion of the digital color difference component signals into the digital RGB component signals may be performed in accordance with equations representing a relationship between the digital color difference component signals and the digital RGB component signals, each factor included in the equations being a fractional number having a denominator of a power of 2. Accordingly, the digital to digital conversion is performed by simple adding operations of digital data.

In one embodiment of the present invention, the digital-to-digital conversion of the digital color difference component signals into the digital RGB component signals may be performed in accordance with the following equations:

$$R_D = Y_D + (R-Y)_D$$

$$G_D = Y_D - (½) \times (R-Y)_D - (³⁄₁₆) \times (B-Y)_D$$

$$B_D = Y_D + (B-Y)_D$$

where $R_D$, $G_D$ and $B_D$ represent the digital RGB component signals; $Y_D$, $(R-Y)_D$ and $(B-Y)_D$ represent the digital color difference component signals, $Y_D$ being a digital luminance signal, $(R-Y)_D$ being a digital signal obtained by subtracting the luminance signal from a red component signal, $(B-Y)_D$ being a digital signal obtained by subtracting the luminance signal from a blue component signal.

Additionally, the color video signal processing method of the present invention may further comprise the step of:

applying a process to the digital RGB component signals before the digital RGB component signals are converted into the analog RGB component signals.

Additionally, there is provided according to another aspect of the present invention a color video signal processing apparatus for converting an analog composite signal into analog RGB component signals, the color video signal processing apparatus comprising:

first converting means for converting analog color difference component signals into digital color difference component signals, the analog color difference component signals being obtained from the analog composite signal;

second conversion means for converting the digital color difference component signals into digital RGB component signals by a digital to digital conversion based on an approximation method; and third converting means for converting the digital RGB component signals into analog RGB component signals.

According to this invention, the digital to digital conversion by the second converting means is performed by a simple operation based on a digital signal process by using approximation equations. Thus, a circuit performing the digital-to-digital conversion can be constructed by a simple digital process circuit, resulting in a reduced size of the circuit. This permits the color video signal processing apparatus to be formed in a single LSI chip.

In the color video signal processing apparatus according to the present invention, the digital to digital conversion by the second converting means is performed in accordance with equations representing a relationship between the digital color difference component signals and the digital RGB component signals, each factor included in the equations being a fractional number having a denominator of a power of 2.

In one embodiment of the present invention, the digital-to-digital conversion by the second converting means may be performed in accordance with the following equations:

$$R_D = Y_D + (R-Y)_D$$

$$G_D = Y_D - (½) \times (R-Y)_D - (³⁄₁₆) \times (B-Y)_D$$

$$B_D = Y_D + (B-Y)_D$$

where $R_D$, $G_D$ and $B_D$ represent the digital RGB component signals; $Y_D$, $(R-Y)_D$ and $(B-Y)_D$ represent the digital color difference signals, $Y_D$ being a digital luminance signal, $(R-Y)_D$ being a digital signal obtained by subtracting the luminance signal from a red component signal, $(B-Y)_D$ being a digital signal obtained by subtracting the luminance signal from a blue component signal.

The color video signal processing apparatus according to the present invention may further comprise fourth converting means for converting the analog composite signal into the analog color difference component signals to be supplied to the first converting means.

Additionally, the color video signal processing apparatus may further comprise process applying means for applying a process to the digital RGB component signals before the digital RGB component signals are converted into the analog RGB component signals.

In the color video signal processing apparatus, the first, second and third converting means may comprise circuits which are formed in a single LSI chip.

Other objects, features and advantages of the present invention will become more apparent from the following detailed description when read in conjunction with the accompanying drawings.

BRIEF DESCRIPTION OF THE DRAWINGS

FIG. 3 is an illustration for explaining an operation performed on digital data.

DETAILED DESCRIPTION OF THE PREFERRED EMBODIMENT

Figure 1:
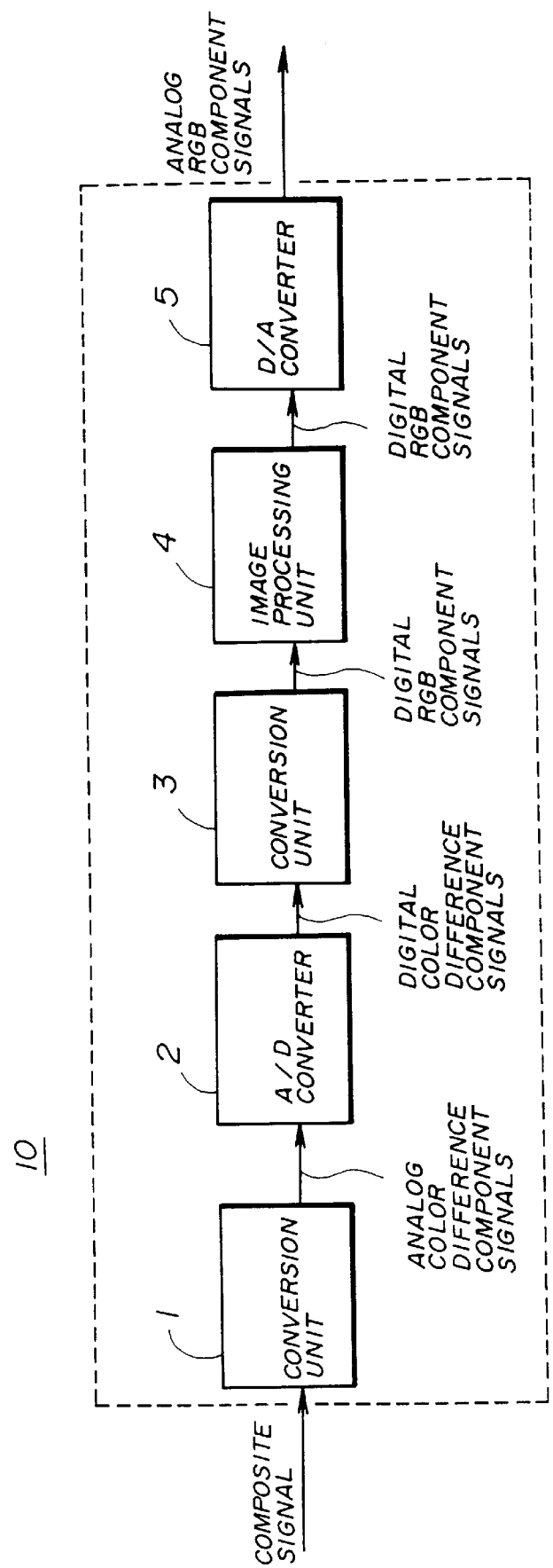
FIG. 1 is a block diagram of a color video signal processing apparatus according to a first embodiment of the present invention.

A description will now be given of a first embodiment of the present invention. FIG. 1 is a block diagram of a color video signal processing apparatus according to the first embodiment of the present invention. In the following description, the suffix "A" attached to a symbol of each signal represents that the signal is an analog signal, and the suffix "D" represents that the signal is a digital signal.

As shown in FIG. 1, the color video signal processing apparatus 10 comprises a conversion unit 1 for converting a composite signal into analog color difference component signals, an analog-to-digital (A/D) converter 2 for converting the analog color difference component signals into digital color difference component signals, a conversion unit 3 for converting the digital color difference component signals into digital RGB component signals, an image processing unit 4 for processing the digital RGB component signals, and a D/A converter 5 for converting the digital RGB component signals into analog RGB component signals. The analog RGB component signals are supplied to a CRT display so that a video image is displayed on the CRT display.

Figure 2:
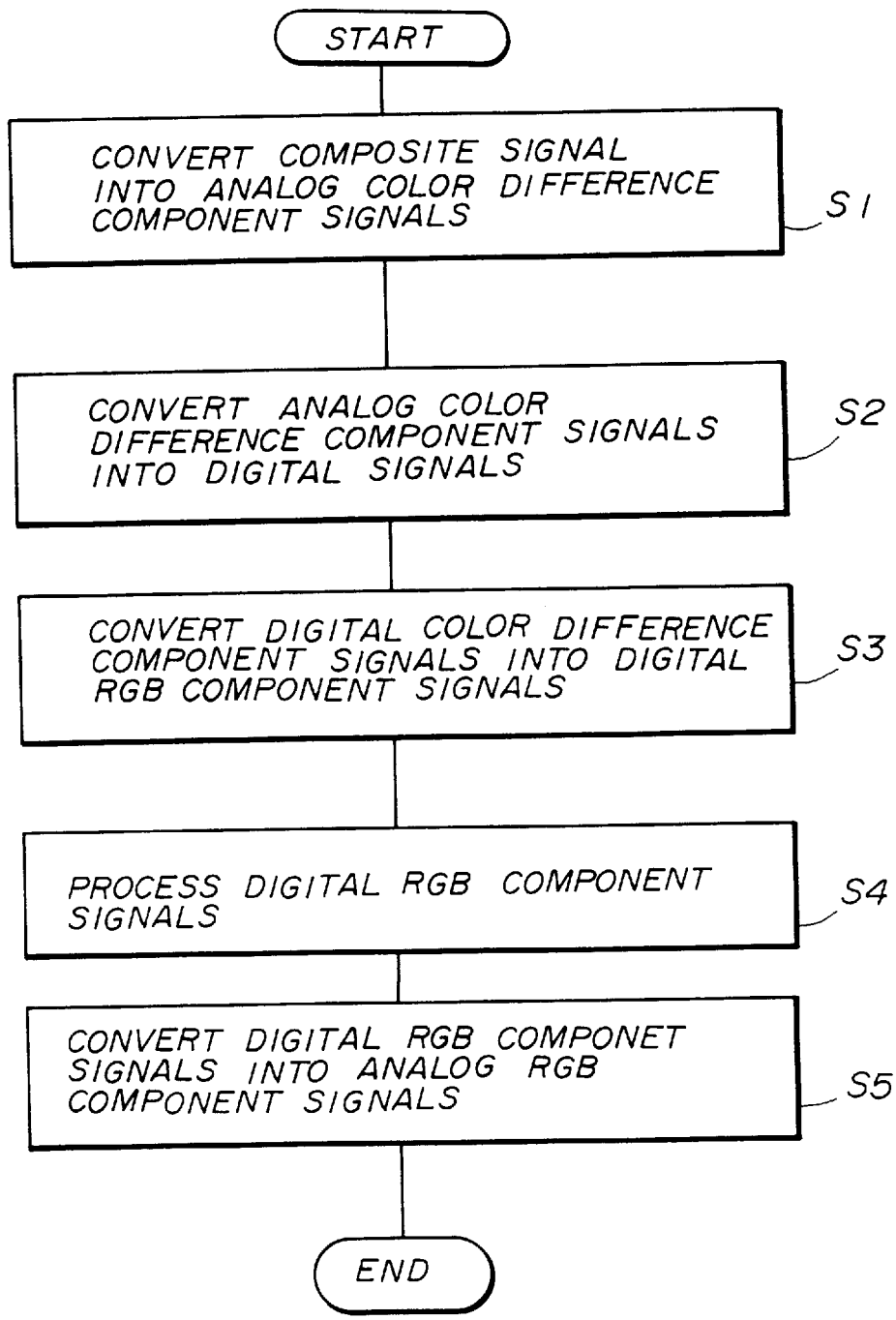
FIG. 2 is a flowchart of an operation performed by the color video signal processing apparatus shown in FIG. 1.

A description will now be given of an operation of the color video signal processing apparatus shown in FIG. 1. FIG. 2 is a flowchart of an operation performed by the color video signal processing apparatus shown in FIG. 1.

As shown in FIG. 2, the composite signal supplied by an external signal source such as a TV signal receiving unit is processed, in step S1, by the conversion unit 1 so as to convert the composite signal into the analog color difference component signals $Y_A$, $(R-Y)_A$ and $(B-Y)_A$. In step S2, the analog color difference component signals $Y_A$, $(R-Y)_A$ and $(B-Y)_A$ are converted into the digital color difference component signals by the A/D converter 2. Then, in step S3, the digital color difference component signals $Y_D$, $(R-Y)_d$ and $(B-Y)_D$ are converted into the digital RGB component signals $Y_D$, $(R-Y)_D$ and $(B-Y)_D$ by the conversion unit 3. The conversion in step S3 is performed by a digital process based on approximation equations described later. The digital RGB component signals $Y_D$, $(R-Y)_D$ and $(B-Y)_D$ are then processed, in step S4, so that the signals are temporarily stored in a memory or a desired color change is applied to an image displayed on the CRT display. The process in step S4 is performed by the image processing unit 4. Thereafter, the processed digital RGB component signals are converted, in step S5, into the analog RGB component signals to be supplied to the CRT display. The conversion in step S5 is performed by the D/A converter 5. It should be noted that the processing of step S4 may be eliminated when such a process is not required.

As previously mentioned, in the conventional method, the analog color difference component signals are converted into the analog RGB component signals. That is, in the conventional method, the color difference component signals are processed by analog signal processing so as to obtained the analog RGB component signals.

However, in the present embodiment, the analog color difference component signals are converted into the digital color difference component signals before they are converted into the RGB component signals. That is, in step S2, the analog color difference component signals are converted into the analog digital color difference component signals, and then the digital color difference component signals are converted into the digital RGB component signals. Since the process of step S3 is a digital to digital conversion process, the equations (4) to (6), especially the equation (5), cannot be used. Therefore, in the present embodiment, the equations (4) to (6) are substituted by the following equations (7) to (9) so that the signals can be processed by a binary calculation method.

$$DR = DY + DRY \tag{7}$$

$$DG = DY - (\tfrac{1}{2}) \times DRY - (\tfrac{3}{16}) \times DBY \tag{8}$$

$$DB = DY + DBY \tag{9}$$

where, DY represents the digital color difference component signal $Y_D$ comprising n bits;

DRY represents the digital color difference component signal $(R-Y)_D$ comprising n bits;

DBY represents the digital color difference component signal $(B-Y)_D$ comprising n bits;

DR represents the digital R component signal $R_D$ comprising n bits;

DG represents the digital G component signal $G_D$ comprising n bits; and

DB represents the digital B component signal $B_D$ comprising n bits.

In the equation (8), since each factor in the equation (5) is approximated by a simple fractional number, the digital color difference component signals, each of which comprises n bits, can be easily converted into the digital RGB component signals.

A description will now be given of a method for obtaining the equations (7) to (9) from the equations (4) to (6).

Since the equation (4) does not include any factor, the equation (4) which is provided for the analog calculation process can be directly converted into an equation which is for a digital calculation. Similarly, the equation (6) which is provided for the analog calculation process can be directly converted into an equation which is provided for a digital calculation. Thus, the following equations (10) and (11) are obtained from the equations (4) and (6).

$$R_D = Y_D + (R-Y)_D \tag{10}$$

$$B_D = Y_D + (B-Y)_D \tag{11}$$

The equations (10) and (11) correspond to the above-mentioned equations (7) and (9), respectively.

If the equation (8) is directly applied to the digital calculation process, the following equation (12) is obtained.

$$G_D = Y_D - (0.3/0.59) \times (R-Y)_D - (0.11/0.59) \times (B-Y)_D \tag{12}$$

The factor (0.3/0.59) is approximated by a fractional number "½". The factor (0.11/0.59) which is equal to 0.18644... is approximated by a fractional number "3/16" which is equal to 0.1875. Thus, the equation (12) can be approximated by the following equation (13) in which each factor is represented by a fractional number having a denominator of a power of 2.

$$G_D = Y_D - (\tfrac{1}{2}) \times (R-Y)_D - (\tfrac{3}{16}) \times (B-Y)_D \tag{13}$$

The equation (13) corresponds to the above-mentioned equation (8).

A description will now be given of an example of a conversion from 4-bit digital color difference component signals into 4-bit digital RGB component signals.

In the following description, Y[3:0] represents 4-bit digital data corresponding to the digital color difference component signal $Y_D$; RY[3:0] represents 4-bit digital data corresponding to the digital color difference component signal $(R-Y)_D$; BY[3:0] represents 4-bit digital data corresponding to the digital color difference component signal $(B-Y)_D$; ~Y[3:0] represents 4-bit data obtained by an inversion of the 4-bit digital data Y[3:0].

Now, if each of the analog RGB component signals $R_A$, $G_A$ and $B_A$ takes a value from 0 to 15 (this range corresponds to 16 numbers represented by 4-bit data), the analog color difference component signal $Y_A$ also takes a value from 0 to 15 as appreciated by the equation (1). The analog color difference component signal $(R-Y)_A$ takes a value from 10.5 to -10.5 as appreciated by the equation (2). Similarly, the analog color difference component signal $(R-Y)_A$ takes a value from 13.35 to -13.35 as appreciated by the equation (2).

When the analog value of the analog color difference component signal $Y_A$ is represented by 4-bit digital data, an integer from 0 to 15 can be represented by using 4 bits. However, when the values of each of the analog color difference component signals $(R-Y)_A$ and $(B-Y)_A$ are represented by 4-bit digital data, the most significant bit is used for representing a plus or minus sign since the value of each of the analog color difference component signals $(R-Y)_A$ and $(B-Y)_A$ ranges from a negative value to a positive value. This means that significant digits are 3 bits from the most significant bit of the 4-bit digital data with respect to the analog color difference component signals $(R-Y)_A$ and $(B-Y)_A$. Thus, the 4-bit digital data Y[3:0] takes an integer from 0 to 15, whereas the 4-bit digital data RY[3:0] and the 4-bit digital data BY[3:0] takes an integer from -8 to 7. That is, the 4-bit data RY[3:0] and the 4-bit data BY[3:0] are obtained by removing the least significant bit from 4 bits representing a value from 0 to 15, and adding a plus or minus sign bit in the front of the 3 bits. This means that the 4-bit digital data is multiplied by ½ and a plus or minus sign bit is added.

With regard to the term "(½)×(R−Y)$_D$" in the equation (13), this term was already multiplied by ½ as mentioned above. Thus, this term is directly represented by the 4-bit digital data RY[3:0].

With regard to the term "(3/16)×(B−Y)$_D$" in the equation (13), the term "3×(B−Y)$_D$" is obtained by multiplying the 4-bit digital data BY[3:0] by 6 since the data BY[3:0] has to be multiplied by 2 first and then be multiplied by 3 (2×3=6). Multiplication by 6 can be achieved by summing the data BY[3:0] multiplied by 4 and the data BY[3:0] multiplied by 2. That is, the term "3×(B−Y)$_D$" can be obtained by summing the 2 bits leftward shifted data BY[3:0] and the 1 bit leftward shifted data BY[3:0]. This process is shown in FIG. 3. The term "/16" can be executed by removing 4 bits from the least significant bit. Thus, the term "(3/16)×(B−Y)$_D$" is represented by {S4, S3, S2}.

In the equation (13), it is assumed that the term Y$_D$ is represented by A; the term "(½)×(R−Y)$_D$" is represented by B; and the term "(3/16)×(B−Y)$_D$" is represented by C. Since A ranges from 0 to 15; B ranges from −8 to 7; C ranges from −4 to 3, 6 bits are needed for the calculation. Additionally, the operation A−B−C corresponding to the right side of the equation (13) is represented by "~{~A+B+C}". The mark "~" represents an inversion.

Figure 4:
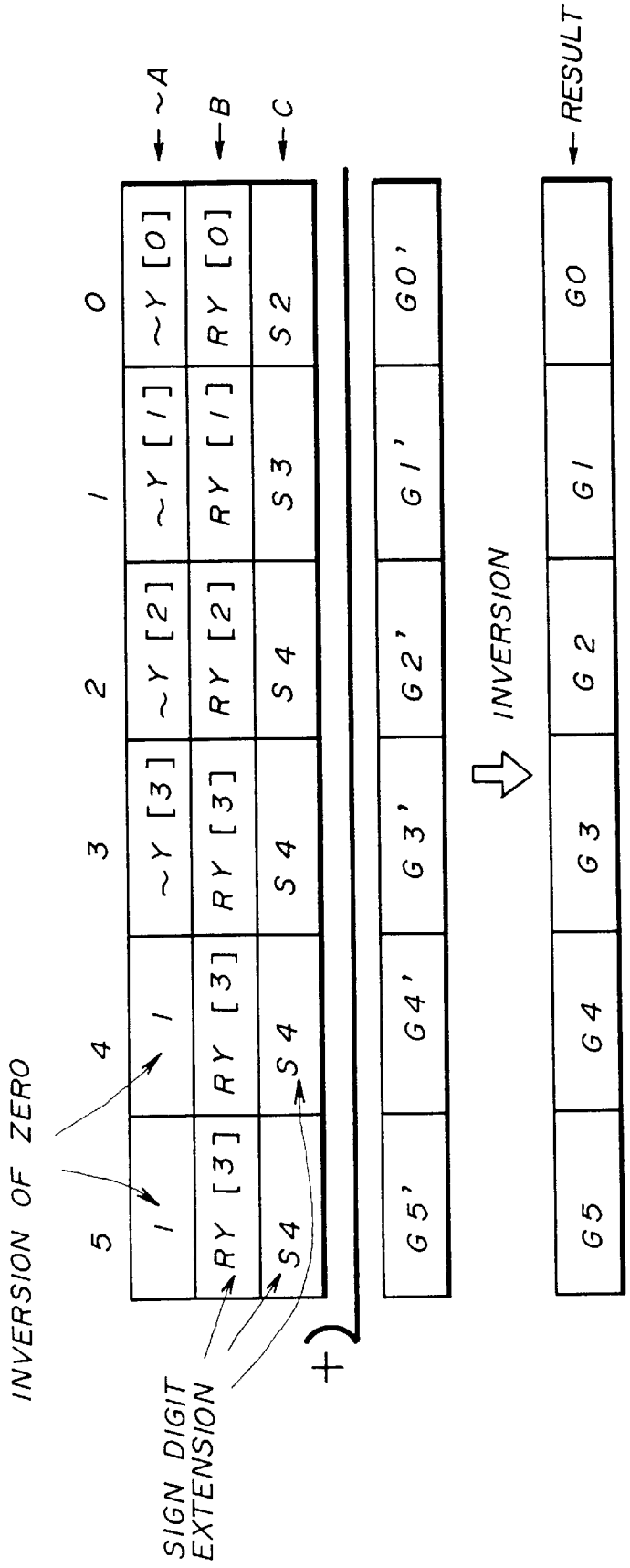
FIG. 4 is an illustration for explaining a calculation of digital data.

FIG. 4 illustrates the operation "~{~A+B+C}". In the result of the operation "~{~A+B+C}", the digital data G[3:0] is represented by {G3, G2, G1, G0}. If the bit G5 is equal to 1, this means that the result of the operation is a negative value, which condition should not occur. Thus, in such a case, the data G[3:0] is forcibly set to zero. Additionally, if the bit G5 is equal to zero and the bit G4 is equal to 1, this means that the result of the operation is greater than 15, which condition should not occur. Thus, in such a case, the data G[3:0] is forcibly set to 15.

As mentioned above, the digital color difference component signals Y$_D$, (R−Y)$_D$ and (R−B)$_D$ can be converted into the digital RGB component signals R$_D$, G$_D$ and B$_D$ by a simple operation based on a digital signal process by using the approximation equation. Thus, the conversion unit 3 shown in FIG. 1 can be constructed by a simple digital process circuit. This permits the color video signal processing apparatus 10 to be formed in a single LSI chip.

It should be noted each unit shown in FIG. 1 can be formed as an individual LSI package or some or all of them can be formed in a single LSI package.

The present invention is not limited to the specifically disclosed embodiments, and variations and modifications may be made without departing from the scope of the present invention.

What is claimed is:

1. A color video signal processing method for converting an analog composite signal into analog RGB component signals, comprising the steps of:
    converting said analog composite signal into analog color difference component signals;
    converting said analog color difference component signals into digital color difference component signals;
    converting said digital color difference component signals into digital RGB component signals by a digital-to-digital conversion method performed in accordance with equations representing a relationship between said digital color difference component signals and said digital RGB component signals, each factor included in said equations being a fractional number having a denominator of a power of 2; and
    converting said digital RGB component signals into said analog RGB component signals.

2. The color video signal processing method as claimed in claim 1, wherein the digital to digital conversion of said digital color difference component signals into said digital RGB component signals is performed in accordance with the following equations:

$$R_D = Y_D + (R-Y)_D$$

$$G_D = Y_D - (½) \times (R-Y)_D - (3/16) \times (B-Y)_D$$

$$B_D = Y_D + (B-Y)_D$$

where R$_D$, G$_D$ and B$_D$ represent said digital RGB component signals; Y$_D$, (R−Y)$_D$ and (B−Y)$_D$ represent said digital color difference component signals, Y$_D$ being a digital luminance signal, (R−Y)$_D$ being a digital signal obtained by subtracting said luminance signal from a red component signal, (B−Y)$_D$ being a digital signal obtained by subtracting said luminance signal from a blue component signal.

3. The color video signal processing method as claimed in claim 1, further comprising the step of:
    applying a process to said digital RGB component signals before said digital RGB component signals are converted into said analog RGB component signals.

4. A color video signal processing apparatus for converting an analog composite signal into analog RGB component signals, said color video signal processing apparatus comprising:
    first converting means for converting analog color difference component signals into digital color difference component signals, said analog color difference component signals being obtained from said analog composite signal;
    second conversion means for converting said digital color difference component signals into digital RGB components signals by a digital to digital conversion method performed in accordance with equations representing a relationship between said digital color difference component signals and said digital RGB component signals, each factor included in said equations being a fractional number having a denominator of a power of 2; and
    third converting means for converting said digital RGB component signals into analog RGB component signals.

5. The color video signal processing method as claimed in claim 4, wherein the digital to digital conversion by said second converting means is performed in accordance with the following equations:

$$R_D = Y_D + (R-Y)_D$$

$$G_D = Y_D - (½) \times (R-Y)_D - (3/16) \times (B-Y)_D$$

$$B_D = Y_D + (B-Y)_D$$

where R$_D$, G$_D$ and B$_D$ represent said digital RGB component signals; Y$_D$, (R−Y)$_D$ and (B−Y)$_D$ represent said color difference signals, Y$_D$ being a digital luminance signal, (R−Y)$_D$ being a digital signal obtained by subtracting said luminance signal from a red component signal, (B−Y)$_D$ being a digital signal obtained by subtracting said luminance signal from a blue component signal.

6. The color video signal processing apparatus as claimed in claim 5, further comprising process applying means for applying a process to said digital RGB component signals before said digital RGB component signals are converted into said analog RGB component signals.

7. The color video signal processing apparatus as claimed in claim 4, further comprising fourth converting means for converting said analog composite signal into said analog color difference component signals to be supplied to said first converting means.

8. The color video signal processing apparatus as claimed in claim 4, further comprising process applying means for applying a process to said digital RGB component signals before said digital RGB component signals are converted into said analog RGB component signals.

9. The color video signal processing apparatus as claimed in claim 4, wherein said first, second and third converting means comprise circuits which are formed in a single LSI chip.

10. A color video signal processing apparatus for converting an analog composite signal into analog RGB component signals, said color video signal processing apparatus comprising:
    a first converter that converts analog color difference component signals into digital color difference component signals, said analog color difference component signals being obtained from said analog composite signal;
    a second converter that converts said digital color difference component signals into digital RGB components signals by a digital to digital conversion method performed in accordance with equations representing a relationship between said digital color difference component signals and said digital RGB component signals, each factor included in said equations being a fractional number having a denominator of a power of 2; and
    a third converter that converts said digital RGB component signals into analog RGB component signals.

11. The color video signal processing apparatus as claimed in claim 10, wherein the digital to digital conversion by said second converter is performed in accordance with the following equations:

$$R_D = Y_D + (R-Y)_D$$

$$G_D = Y_D - (1/2) \times (R-Y)_D - (3/16) \times (B-Y)_D$$

$$B_D = Y_D + (B-Y)_D$$

where $R_D$, $G_D$ and $B_D$ represent said digital RGB component signals; $Y_D$, $(R-Y)_D$ and $(B-Y)_D$ represent said color difference signals, $Y_D$ being a digital luminance signal, $(R-Y)_D$ being a digital signal obtained by subtracting said luminance signal from a red component signal, $(B-Y)_D$ being a digital signal obtained by subtracting said luminance signal from a blue component signal.

12. The color video signal processing apparatus as claimed in claim 10, further comprising a fourth converter that converts said analog composite signal into said analog color difference component signals to be supplied to said first converter.

13. The color video signal processing apparatus as claimed in claim 10, further comprising a signal processor that processes said digital RGB component signals before said digital RGB component signals are converted into said analog RGB component signals.

14. The color video signal processing apparatus as claimed in claim 10, wherein said first, second and third converters comprise circuits which are formed in a single LSI chip.

15. A color video signal processing method for converting an analog composite signal into analog RGB component signals, comprising the steps of:
    converting said analog composite signal into analog color difference component signals;
    converting said analog color difference component signals into digital color difference component signals;
    converting said digital color difference component signals into digital RGB component signals by a digital-to-digital conversion method that includes approximation conversion factors with values that permit non-complex binary processing; and
    converting said digital RGB component signals into said analog RGB component signals.

16. The color video signal processing method as claimed in claim 15, wherein said conversion factors comprise a fractional number having a denominator of a power of 2.

17. A color video signal processing apparatus for converting an analog composite signal into analog RGB component signals, said color video signal processing apparatus comprising:
    first converting means for converting analog color difference component signals into digital color difference component signals, said analog color difference component signals being obtained from said analog composite signal;
    second conversion means for converting said digital color difference component signals into digital RGB components signals by a digital to digital conversion method that includes approximation conversion factors with values that permit non-complex binary processing; and
    third converting means for converting said digital RGB component signals into analog RGB component signals.

18. The color video signal processing apparatus as claimed in claim 17, wherein said conversion factors comprise a fractional number having a denominator of a power of 2.

19. A color video signal processing apparatus for converting an analog composite signal into analog RGB component signals, said color video signal processing apparatus comprising:
    a first converter that converts analog color difference component signals into digital color difference component signals, said analog color difference component signals being obtained from said analog composite signal;
    a second converter that converts said digital color difference component signals into digital RGB components signals by a digital to digital conversion method that includes approximation conversion factors with values that permit non-complex binary processing; and
    a third converter that converts said digital RGB component signals into analog RGB component signals.

20. The color video signal processing apparatus as claimed in claim 19, wherein said conversion factors comprise a fractional number having a denominator of a power of 2.

* * * * *